(12) United States Patent
Imamura et al.

(10) Patent No.: US 8,345,729 B2
(45) Date of Patent: Jan. 1, 2013

(54) RADIO COMMUNICATION DEVICE AND RESPONSE SIGNAL DIFFUSION METHOD

(75) Inventors: Daichi Imamura, Kanagawa (JP); Seigo Nakao, Kanagawa (JP); Yoshihiko Ogawa, Kanagawa (JP)

(73) Assignee: Panasonic Corporation, Osaka (JP)

( * ) Notice: Subject to any disclaimer, the term of this patent is extended or adjusted under 35 U.S.C. 154(b) by 145 days.

(21) Appl. No.: 12/673,069

(22) PCT Filed: Aug. 13, 2008

(86) PCT No.: PCT/JP2008/002209
§ 371 (c)(1),
(2), (4) Date: Feb. 11, 2010

(87) PCT Pub. No.: WO2009/022471
PCT Pub. Date: Feb. 19, 2009

(65) Prior Publication Data
US 2011/0182328 A1    Jul. 28, 2011

(30) Foreign Application Priority Data
Aug. 14, 2007  (JP) .................................. 2007-211544

(51) Int. Cl.
H04B 1/00    (2006.01)
(52) U.S. Cl. ........................................ 375/146; 375/130
(58) Field of Classification Search .................. 375/146, 375/140, 130
See application file for complete search history.

(56) References Cited

U.S. PATENT DOCUMENTS

| | | | | |
|---|---|---|---|---|
| 2006/0035643 A1* | 2/2006 | Vook et al. | .................... | 455/450 |
| 2009/0046789 A1* | 2/2009 | Xu et al. | ....................... | 375/260 |
| 2009/0303929 A1 | 12/2009 | Yamamoto | | |

FOREIGN PATENT DOCUMENTS

WO    2008/053930    5/2008

OTHER PUBLICATIONS

3GPP TSG RAN WGI Meeting #49, "Mulitplexing capability of CQIs and ACKfNACKs form different UEs," Nokia Siemens Networks, Nokia, R1-072315, May 2007, pp. 1-4.*
International Search Report dated Nov. 18, 2008.

(Continued)

Primary Examiner — David C. Payne
Assistant Examiner — Brian J Stevens
(74) Attorney, Agent, or Firm — Dickinson Wright PLLC

(57) ABSTRACT

Provided is a radio communication device which can surely prevent inter-code interference while maintaining the use efficiency of an upstream line control channel and suppress separation characteristic of a response signal. The device includes: a control unit (209) which controls a cyclic shift amount of a ZC sequence used for a primary diffusion in a diffusion unit (214) and a Walsh sequence used for secondary diffusion in a diffusion unit (217) according to a PUCCH number inputted from a judgment unit (208); the diffusion unit (214) which performs primary diffusion of the response signal by the ZC sequence set by the control unit (209); and the diffusion unit (217) which performs secondary diffusion of the response signal by the Walsh sequence set by the control unit (209). The diffusion unit (214) performs primary diffusion of the response signal by using the ZC sequence having such a cyclic shift amount that the guard interval at the both ends of the detection window section is maximum in the ZC sequences having different cyclic shift amounts.

6 Claims, 8 Drawing Sheets

CYCLIC SHIFT VALUE OF ZC SEQUENCE (0~11)

WALSH SEQUENCE NUMBER (0~2)

| CCE #1 | | CCE #2 | | CCE #3 | | CCE #4 | | CCE #5 | | CCE #6 | |
|---|---|---|---|---|---|---|---|---|---|---|---|
| CCE #7 | | CCE #8 | | CCE #9 | | CCE #10 | | CCE #11 | | CCE #12 | |
| CCE #13 | | CCE #14 | | CCE #15 | | CCE #16 | | CCE #17 | | CCE #18 | |

OTHER PUBLICATIONS

3GPP TSG RAN WG1 Meeting #51, "Commonality on the Cyclic Shift Hopping patterns of ACK/NACK and CQI on PUCCH," Panasonic, R1-074901, Nov. 2007, pp. 1-2.

3GPP TSG RAN WG1 Meeting #51, "Ordering of the implicit resource allocation table for Uplink ACK/NACK," Panasonic, R1-074918, Nov. 2007, pp. 1-4.

3GPP TSG RAN WG1 Meeting #50bis, "Cyclic Shift Hopping Pattern for Uplink ACK/NACK," Panasonic, R1-074411, Oct. 2007, pp. 1-6.

3GPP TSG RAN WG1 Meeting #51, "Ack/Nack repetition and Implicit Resource Allocation for PUCCH," Panasonic, R1-074917, Nov. 2007, pp. 1-2.

3GPP TSG RAN WG1 Meeting #49, "Mulitplexing capability of CQIs and ACK/NACKs form different UEs," Nokia Siemens Networks, Nokia, R1-072315, May 2007, pp. 1-4.

3GPP TSG RAN WG1 Meeting #46bis, "CDM-based Mulitplexing Method of Multiple ACK/NACK and CQI for E-UTRA Uplink," NTT DoCoMo, Ericsson, Fujitsu, Mitsubishi Electric, Sharp, Toshiba Corporation, R1-062742, Oct. 2006, pp. 1-6.

3GPP TSG RAN WG1 Meeting #46bis, "Scrambling Code for L1/L2 Control Channel with CDM Based Multiplexing in E-UTRA Downlink," KDDI, R1-062945, Oct. 2006, pp. 1-4.

3GPP TSG RAN WG1 Meeting #49, "Allocation of UL ACK/NACK index," LG Electronics, R1-072348, May 2007, pp. 1-4.

3GPP TSG RAN WG1 Meeting #49, "Implicit Resource Allocation of ACK/NACK Signal in E-UTRA Uplink," NTT DoCoMo, Fujitsu, Mitsubishi Electric, R1-072439, May 2007, pp. 1-3.

3GPP TSG RAN WG1 Meeting #49bis, "ACK/NACK performance of high speed UEs," Nokia Siemens Networks, et al., R1-073002, XP050106666, Jun. 25-29, 2007, pp. 1-4.

3GPP TSG RAN WG1 Meeting #49bis, "Usage of Cyclic Shifts and block-wise spreading codes for Uplink ACK/NACK," Panasonic, R1-072799, XP050106483, Jun. 25-29, 2007, pp. 1-2.

3GPP TSG RAN WG1 Meeting #49bis, "Cyclic Shift Hopping of UL ACK Channels," Samsung, R1-073149, XP008123369, Jun. 25-29, 2007, pp. 1-6.

* cited by examiner

RADIO COMMUNICATION DEVICE AND RESPONSE SIGNAL DIFFUSION METHOD

TECHNICAL FIELD

The present invention relates to a radio communication apparatus and response signal spreading method.

BACKGROUND ART

In mobile communication, ARQ (Automatic Repeat Request) is applied to downlink data from a radio communication base station apparatus (hereinafter abbreviated to "base station") to radio communication mobile station apparatuses (hereinafter abbreviated to "mobile stations"). That is, mobile stations feed back response signals representing error detection results of downlink data, to the base station. Mobile stations perform a CRC (Cyclic Redundancy Check) of downlink data, and, if CRC=OK (no error), feed back an ACK (ACKnowledgement), or, if CRC=NG (error present), feed back a NACK (Negative ACKnowledgement), as a response signal to the base station. These response signals are transmitted to the base station using uplink control channels such as a PUCCH (Physical Uplink Control CHannel) and uplink L1/L2 CCH (L1/L2 Control CHannel).

Also, as shown in FIG. 1, studies are underway to perform code-multiplexing by spreading a plurality of response signals from a plurality of mobile stations using ZC (Zadoff-Chu) sequences and Walsh sequences (see Non-Patent Document 1). In FIG. 1, ($W_0$, $W_1$, $W_2$, $W_3$) represents a Walsh sequence having a sequence length of 4. As shown in FIG. 1, first, an ACK or NACK response signal from a mobile station is subject to first spreading in one symbol by a ZC sequence (having a sequence length of 12) on the frequency domain. Next, the response signal subjected to first spreading is subject to an IFFT (Inverse Fast Fourier Transform) in association with $W_0$ to $W_3$. The response signal spread on the frequency domain by a ZC sequence having a sequence length of 12 is transformed to a ZC sequence having a sequence length of 12 on the time domain by this IFFT. Then, the signal subjected to the IFFT is subject to second spreading using a Walsh sequence (having a sequence length of 4). That is, one response signal is allocated to four symbols $S_0$ to $S_3$ individually. Similarly, response signals of other mobile stations are spread using ZC sequences and Walsh sequences. Here, different mobile stations use ZC sequences of different cyclic shift values on the time domain, or different Walsh sequences. In this case, the sequence length of ZC sequence on the time domain is 12, so that it is possible to use twelve ZC sequences of the cyclic shift values "0" to "11," generated from the same ZC sequence. Also, the sequence length of Walsh sequence is 4, so that it is possible to use four different Walsh sequences. Therefore, in an ideal communication environment, it is possible to code-multiplex maximum 48 (12×4) response signals from mobile stations.

Here, there is no cross-correlation between ZC sequences of different cyclic shift values generated from the same ZC sequence. Therefore, in an ideal communication environment, a plurality of response signals subjected to spreading and code-multiplexing by ZC sequences of different cyclic shift values (0 to 11), can be demultiplexed on the time domain without inter-code interference, by correlation processing in the base station.

However, due to the influence of, for example, transmission timing difference in mobile stations, multipath delayed waves and frequency offsets, a plurality of response signals from a plurality of mobile stations do not always arrive at a base station at the same time. For example, if the transmission timing of a response signal spread by a ZC sequence of the cyclic shift value "0" is delayed from the correct transmission timing, the correlation peak of the ZC sequence of the cyclic shift value "0" may appear in the detection window for the ZC sequence of the cyclic shift value "1." Further, if a response signal spread by the ZC sequence of the cyclic shift value "0" has a delay wave, interference leakage due to the delayed wave may appear in the detection window for the ZC sequence of the cyclic shift value "1." That is, in these cases, the ZC sequence of the cyclic shift value "1" is interfered by the ZC sequence of the cyclic shift value "0." Therefore, in these cases, the separation performance degrades in a response signal spread by the ZC sequence of the cyclic shift value "0" and a response signal spread by the ZC sequence of the cyclic shift value "1." That is, if ZC sequences of adjacent cyclic shift values are used, the separation performance of response signals may degrade.

Therefore, up till now, if a plurality of response signals are code-multiplexed by spreading of ZC sequences, a cyclic shift interval is provided between the ZC sequences, in order to suppress inter-code interference between the ZC sequences. For example, when the cyclic shift interval between ZC sequences is 2, studies are underway to use only six ZC sequences of the cyclic shift values "0," "2" "4" "6," "8" and "10" in first spreading of response signals, amongst twelve ZC sequences of the cyclic shift values "0" to "11." Therefore, if Walsh sequences having a sequence length of 4 are used in second spreading of response signals, it is possible to code-multiplex maximum 24 (6×4) response signals from mobile stations.

Also, the base station transmits control information for reporting resource allocation results of downlink data, to the mobile stations. This control information is transmitted to the mobile stations using downlink control channels such as PDCCH (Physical Downlink Control CHannel), downlink L1/L2 CCH (L1/L2 Control CHannel) and DL grant (DownLink grant) provided on a per mobile station basis. Each PDCCH occupies one or a plurality of CCE's (Control Channel Elements). If one PDCCH occupies a plurality of CCE's, the plurality of CCE's occupied by the PDCCH are consecutive. Based on the number of CCE's required to notify control information, the base station allocates an arbitrary PDCCH among the plurality of PDCCH's to each mobile station, maps control information on the physical resources associated with the CCE's occupied by the allocated PDCCH's, and performs transmission.

Also, to use downlink communication resources efficiently without signaling to report PUCCH's used for transmitting response signals from the base station to the mobile stations, studies are underway to associate CCE's with PUCCH's on a one-to-one basis. According to this association, each mobile station can decide the PUCCH to use to transmit a response signal from that mobile station, from the CCE's associated with the physical resources on which control information for that mobile station is mapped. That is, each mobile station maps a response signal from that mobile station on physical resources, based on the CCE's associated with physical resources on which control information for that mobile station is mapped.

Here, the number of CCE's occupied by PDCCH varies according to the MCS (Modulation and Coding Scheme) of the PDCCH. If a mobile station is located far from a base station and has lower received signal quality, the base station reduces the modulation level or coding rate of PDCCH while increasing the number of CCE's. By contrast, if the mobile station is located near the base station and has higher received signal quality, the base station increases the modulation level or coding rate of PDCCH while decreasing the number of CCE's. That is, a PDCCH of a lower MCS level occupies a larger number of CCE's, and a PDCCH of a higher MCS level occupies a smaller number of CCE's. In other words, a mobile station to which a PDCCH of a low MCS level is allocated provides a large number of CCE's, and a mobile station to which a PDCCH of a high MCS level is allocated provides a small number of CCE's. For example, when the coding rate of a PDCCH is one of $2/3$, $1/3$ and $1/6$, and a PDCCH of the coding rate $2/3$ occupies one CCE, an PDCCH of the coding rate $1/3$ occupies two CCE's, and a PDCCH of the coding rate $1/6$ occupies four CCE's.

Also, as described above, studies are underway to allow a single mobile station to transmit a response signal using only the PUCCH associated with the CCE of the minimum number among a plurality of CCE's in the case of allocating these CCE's to the mobile station (see Non-Patent Document 2).

Non-Patent Document 1: Multiplexing capability of CQIs and ACK/NACKs form different UEs (ftp://ftp.3gpp.org/TSG_RAN/WG1_RL1/TSGR1_49/Docs/R1-072315.zip)

Non-Patent Document 2: R1-072348, LG Electronics, "Allocation of UL ACK/NACK index", 3GPP TSG-RAN WG1 Meeting #49, Kobe, Japan, May 7-11, 2007

DISCLOSURE OF INVENTION

Problems to be Solved by the Invention

However, with the above conventional techniques, the cyclic shift interval between ZC sequences is 2, which is the minimum interval taking into account the use efficiency of ZC sequences (i.e. use efficiency of PUCCH), and, consequently, inter-code interference may occur between ZC sequences and the separation performance of response signals may degrade.

It is therefore an object of the present invention to provide a radio communication apparatus and response signal spreading method for preventing inter-code interference reliably and suppressing degradation of separation performance of response signals while maintaining the use efficiency of uplink control channels such as a PUCCH.

Means for Solving the Problem

The radio communication apparatus of the present invention employs a configuration having: a spreading section that spreads a response signal using one of a plurality of sequences that can be separated from each other by different cyclic shift values; and a transmitting section that transmits the spread response signal, in which the spreading section spreads the response signal using a sequence of a cyclic shift value that maximize guard intervals at both ends of a detection window interval among the plurality of sequences.

The response signal spreading method of the present invention includes: a spreading step of spreading a response signal using one of a plurality of sequences that can be separated from each other by different cyclic shift values; and a transmitting step of transmitting the spread response signal, in which, in the spreading step, the response signal is spread using a sequence of a cyclic shift value that maximizes guard intervals at both ends of a detection window interval among the plurality of sequences.

Advantageous Effect of the Invention

According to the present invention, it is possible to prevent inter-code interference reliably and suppress degradation of separation performance of response signals while maintaining the use efficiency of uplink control channels.

BEST MODE FOR CARRYING OUT THE INVENTION

An embodiment of the present invention will be explained below in detail with reference to the accompanying drawings.

Here, there are cases where all uplink control channels to allocate from a base station to mobile stations are collectively referred to as a "PUCCH." However, for ease of explanation, in the following explanation, each uplink control channel, provided on a per mobile station basis, will be referred to as a "PUCCH." Also, there is no technical difference between the former PUCCH and the latter PUCCH, so that the present invention is applicable to either PUCCH.

Similarly, there are cases where all downlink control channels to allocate from a base station to mobile stations are collectively referred to as "PDCCH." However, for ease of explanation, in the following explanation, each downlink control channel, provided on a per mobile station basis, will be referred to as a "PDCCH." Also, there is no technical difference between the former PDCCH and the latter PDCCH, so that the present invention is applicable to either PDCCH.

Figure 2:
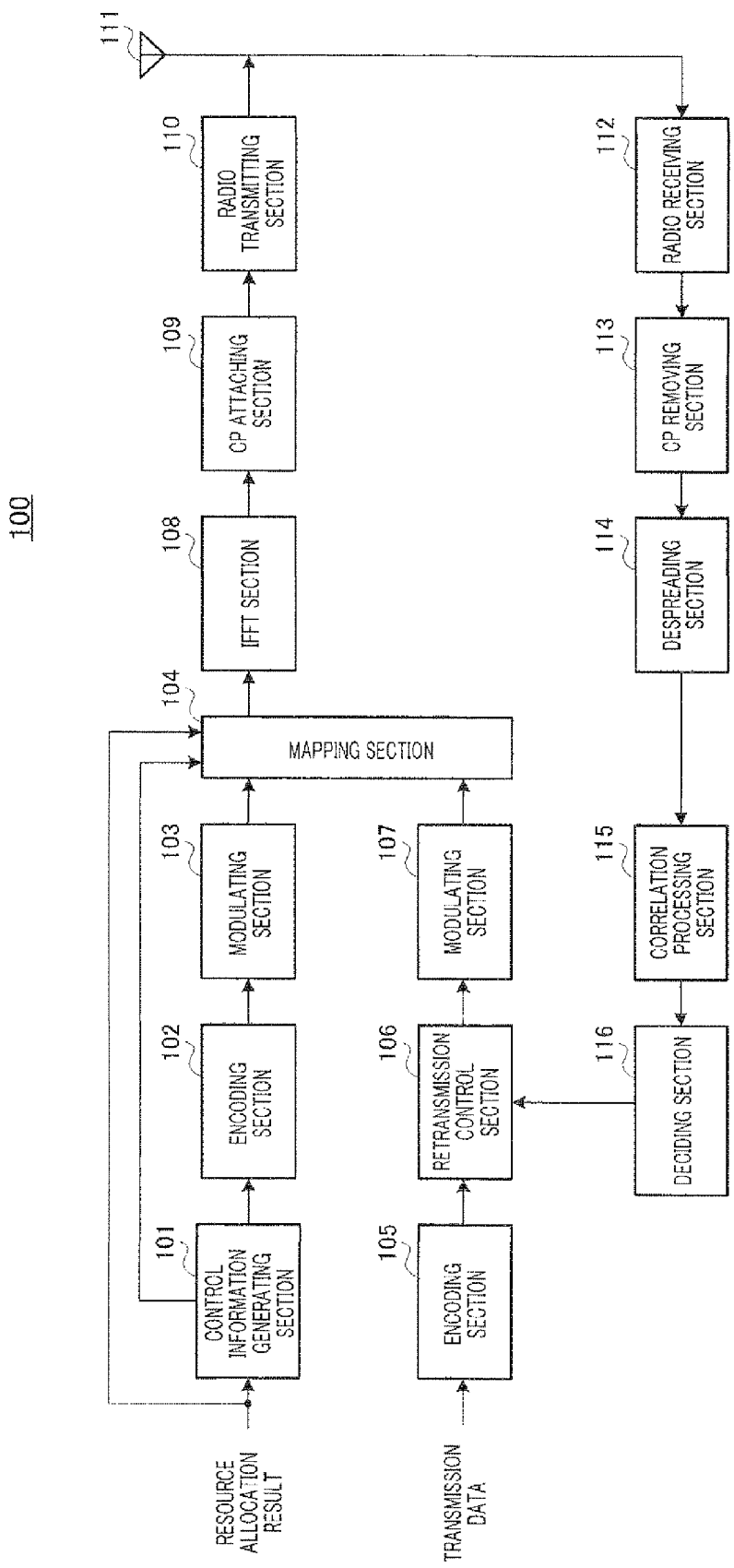
FIG. 2 is a block diagram showing the configuration of a base station according to an embodiment of the present invention.
Figure 3:
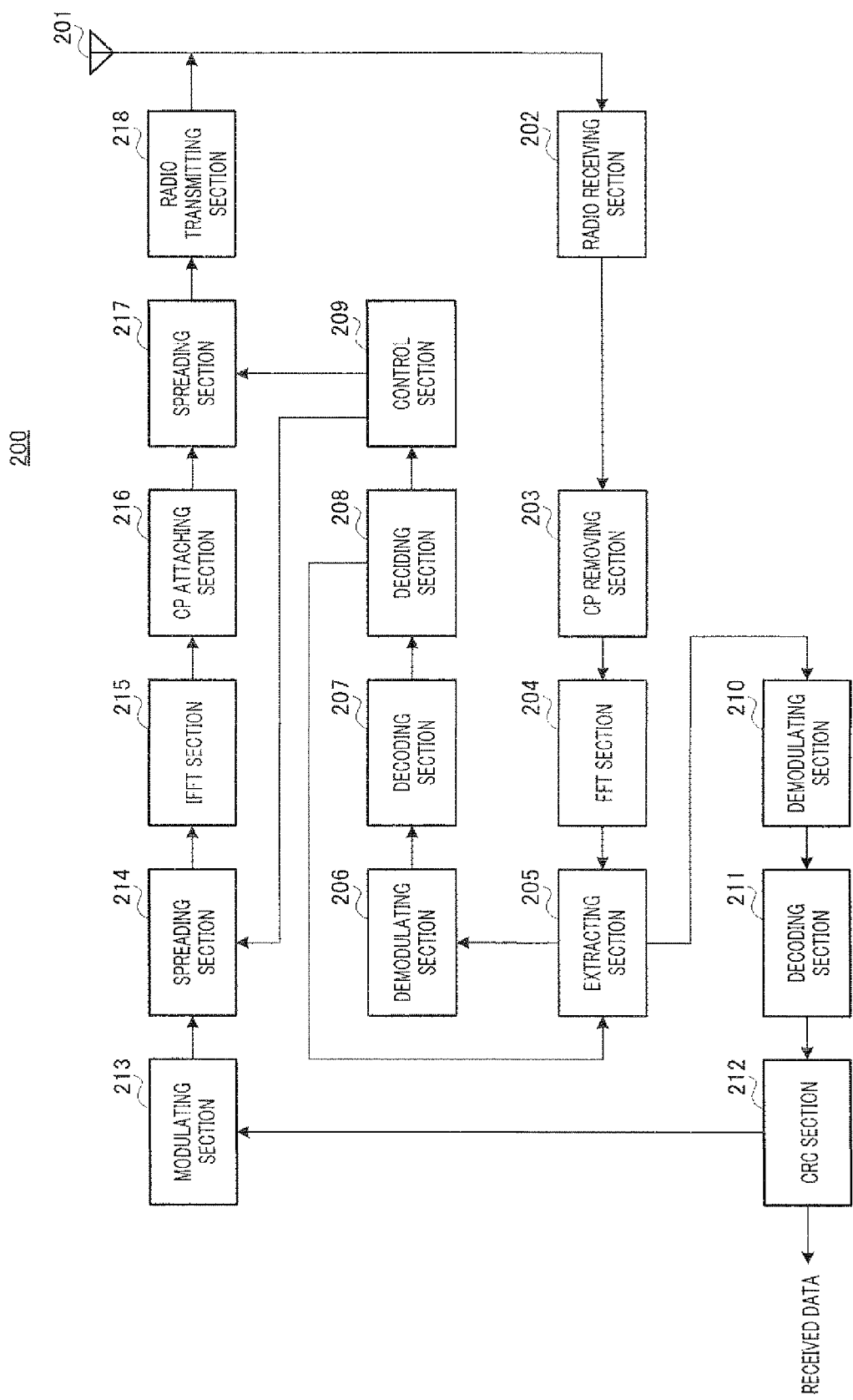
FIG. 3 is a block diagram showing the configuration of a mobile station according to an embodiment of the present invention.

FIG. 2 shows the configuration of base station 100 according to the present embodiment, and FIG. 3 shows the configuration of mobile station 200 according to the present embodiment.

Here, to avoid complicated explanation, FIG. 2 shows components associated with transmission of downlink data and components associated with reception of uplink response signals to the downlink data, which are closely related to the present invention, and the illustration and explanation of the components associated with reception of uplink data will be omitted. Similarly, FIG. 3 shows components associated with reception of downlink data and components associated with transmission of uplink response signals to the downlink data, which are closely related to the present invention, and the illustration and explanation of the components associated with transmission of uplink data will be omitted.

Also, in the following explanation, a case will be described where ZC sequences are used in first spreading and Walsh sequences are used in second spreading. Here, for first spreading, it is equally possible to use sequences that can be separated from each other by different cyclic shift values, other than ZC sequences. Similarly, for second spreading, it is equally possible to use orthogonal sequences other than Walsh sequences.

Further, in the following explanation, a case will be described where a ZC sequence having a sequence length of 12 and a Walsh sequence having a sequence length of 4 ($W_0$, $W_1$, $W_2$, $W_3$) are used. However, the present invention is not limited to these sequence lengths.

Further, in the following explanation, twelve ZC sequences of the cyclic shift values "0" to "11" will be referred to as "ZC #0" to "ZC #11," and four Walsh sequences of sequence numbers "0" to "3" will be referred to as "W #0" to "W #3."

Further, a case will be described with the following explanation where three Walsh sequences, W #0 to W #2, are used among Walsh sequences W #0 to W #3.

Figure 4:
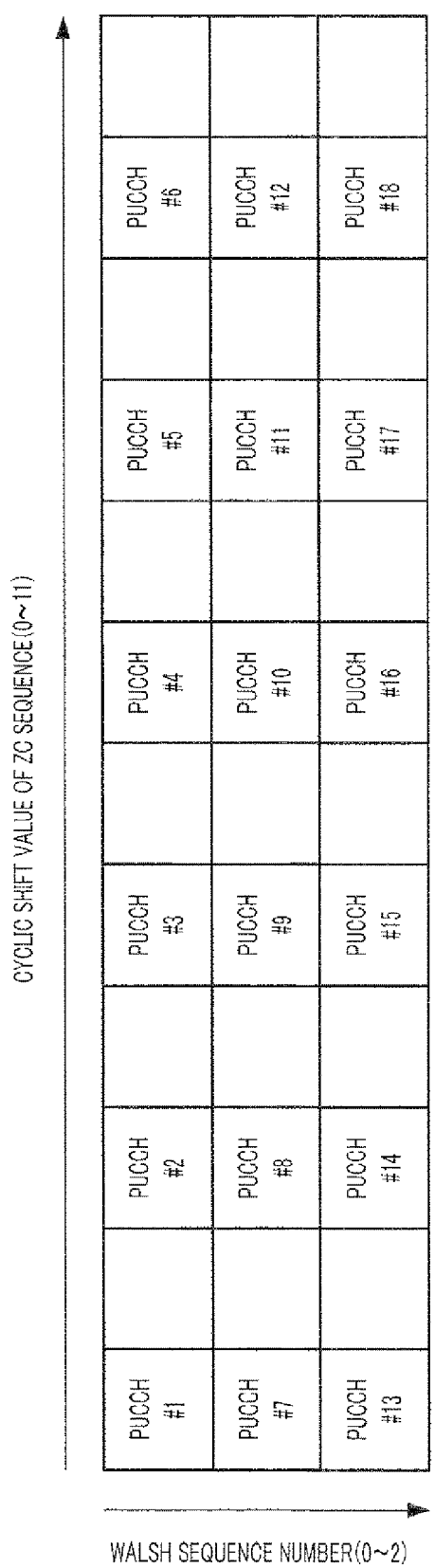
FIG. 4 illustrates associations between ZC sequences, Walsh sequences and PUCCH's according to an embodiment of the present invention.

Also, as shown in FIG. 4, the PUCCH numbers are defined by the cyclic shift values of ZC sequences and Walsh sequence numbers. The following explanation presumes that the CCE numbers and the PUCCH numbers are associated on a one-to-one basis.

In base station 100 shown in FIG. 2, control information generating section 101 and mapping section 104 receive as input a resource allocation result of downlink data.

Control information generating section 101 generates control information per mobile station to report the resource allocation result, and outputs the control information to encoding section 102. Control information, which is provided per mobile station, includes mobile station ID information to indicate to which mobile station the control information is directed. For example, control information includes, as mobile station ID information, CRC bits masked by the ID number of the mobile station to which control information is carried. Control information per mobile station is encoded in encoding section 102, modulated in modulating section 103 and received as input in mapping section 104. Further, control information generating section 101 performs PDCCH allocation every PDCCH of each mobile station, based on the number of CCE's required to carry control information (i.e. the number of CCE's occupied), and outputs the CCE numbers corresponding to the allocated PDCCH's to mapping section 104. Further, as described above, encoding section 102 and modulating section 103 change the coding rate and modulation level of control information based on the number of CCE's occupied by one PDCCH.

On the other hand, encoding section 105 encodes transmission data for each mobile station (i.e. downlink data) and outputs the encoded transmission data to retransmission control section 106.

Upon initial transmission, retransmission control section 106 holds encoded transmission data on a per mobile station basis, and outputs data to modulating section 107. Retransmission control section 106 holds transmission data until retransmission control section 106 receives as input an ACK of a mobile station from deciding section 116. Further, upon receiving as input a NACK of a mobile station from deciding section 116, that is, upon retransmission, retransmission control section 106 outputs the transmission data corresponding to that NACK to modulating section 107.

Modulating section 107 modulates the encoded transmission data received as input from retransmission control section 106, and outputs the result to mapping section 104.

Upon transmission of control information, mapping section 104 maps the control information received as input from modulating section 103 on physical resources based on the CCE numbers received as input from control information generating section 101, and outputs the result to IFFT section 108. That is, mapping section 104 maps control information on the subcarriers corresponding to the CCE numbers in a plurality of subcarriers comprised of an OFDM symbol, on a per mobile station basis.

On the other hand, upon transmission of downlink data, mapping section 104 maps transmission data per mobile station on physical resources based on the resource allocation result, and outputs the mapping result to IFFT section 108. That is, based on the resource allocation result, mapping section 104 maps transmission data on subcarriers in a plurality of subcarriers comprised of an OFDM symbol, on a per mobile station basis.

IFFT section 108 generates an OFDM symbol by performing an IFFT of a plurality of subcarriers on which control information or transmission data is mapped, and outputs the OFDM symbol to CP (Cyclic Prefix) attaching section 109.

CP attaching section 109 attaches the same signal as the signal at the tail end part of the OFDM symbol, to the head of that OFDM symbol, as a CP.

Radio transmitting section 110 performs transmission processing such as D/A conversion, amplification and up-conversion on the OFDM symbol with a CP, and transmits the result from antenna 111 to mobile station 200 (in FIG. 3).

On the other hand, radio receiving section 112 receives a response signal transmitted from mobile station 200, via antenna 111, and performs receiving processing such as down-conversion and A/D conversion on the response signal.

CP removing section 113 removes the CP attached to the response signal subjected to receiving processing.

Despreading section 114 despreads the response signal by the Walsh sequence that is used in second spreading in mobile station 200, and outputs the despread response signal to correlation processing section 115.

Correlation processing section 115 finds the correlation value between the response signal received as input from despreading section 114, that is, the response signal spread by a ZC sequence, and the ZC sequence that is used in first spreading in mobile station 200, and outputs the correlation value to deciding section 116.

Deciding section 116 detects a correlation peak on a per mobile station basis, using a detection window set per mobile station on the time domain, thereby detecting a response signal on a per mobile station basis. For example, upon detecting a correlation peak in detection window #1 for mobile station #1, deciding section 116 detects the response signal from mobile station #1. Deciding section 116 then decides whether the detected response signal is an ACK or NACK, and outputs the ACK or NACK to retransmission control section 106, on a per mobile station basis.

On the other hand, in mobile station 200 shown in FIG. 3, radio receiving section 202 receives an OFDM symbol transmitted from base station 100, via antenna 201, and performs receiving processing such as down-conversion and A/D conversion on the OFDM symbol.

CP removing section 203 removes the CP attached to the OFDM symbol subjected to receiving processing.

FFT (Fast Fourier Transform) section 204 acquires control information or downlink data mapped on a plurality of subcarriers by performing an FFT of the OFDM symbol, and outputs the control information or downlink data to extracting section 205.

Upon receiving the control information, extracting section 205 extracts the control information from the plurality of subcarriers and outputs it to demodulating section 206. This control information is demodulated in demodulating section 206, decoded in decoding section 207 and received as input in deciding section 208.

On the other hand, upon receiving downlink data, extracting section 205 extracts the downlink data directed to the subject mobile station from the plurality of subcarriers, based on the resource allocation result received as input from deciding section 208, and outputs the downlink data to demodulating section 210. This downlink data is demodulated in demodulating section 210, decoded in decoding section 211 and received as input in CRC section 212.

CRC section 212 performs an error detection of the decoded downlink data using a CRC, generates an ACK in the case of CRC=OK (no error) and a NACK in the case of CRC=NG (error present), as a response signal, and outputs the generated response signal to modulating section 213. Further, in the case of CRC=OK (no error), CRC section 212 outputs the decoded downlink data as received data.

Deciding section 208 performs a blind detection of whether or not the control information received as input from decoding section 207 is directed to the subject mobile station. For example, deciding section 208 decides that, if CRC=OK (no error) as a result of demasking CRC bits by the ID number of the subject mobile station, control information is directed to that mobile station. Further, deciding section 208 outputs the control information directed to the subject mobile station, that is, the resource allocation result of downlink data for that mobile station, to extracting section 205. Further, deciding section 208 decides a PUCCH that can be used to transmit a response signal from the subject mobile station, based on the CCE numbers corresponding to subcarriers on which the control information directed to that mobile station is mapped, and outputs the decision result (i.e. PUCCH number) to control section 209.

Based on the PUCCH number received as input from deciding section 208, control section 209 controls the cyclic shift value of a ZC sequence that is used in first spreading in spreading section 214 and a Walsh sequence that is used in second spreading in spreading section 217. That is, control section 209 sets the ZC sequence of the cyclic shift value selected based on the PUCCH number received as input from deciding section 208, in spreading section 214, and sets the Walsh sequence selected based on the PUCCH number received as input from deciding section 208, in spreading section 217. The sequence control in control section 209 will be described later in detail.

Modulating section 213 modulates the response signal received as input from CRC section 212 and outputs the result to spreading section 214.

Figure 1:
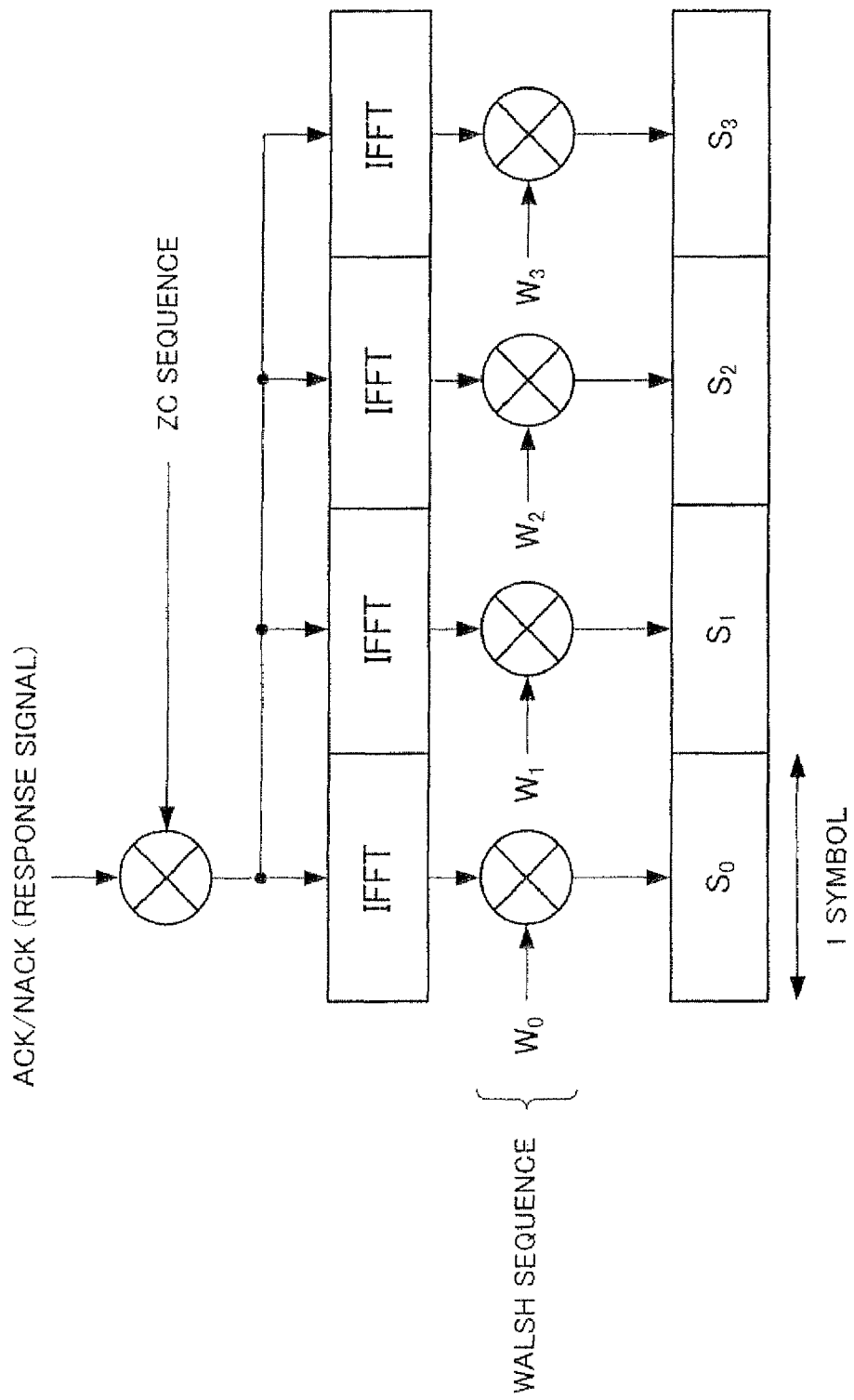
FIG. 1 shows a response signal spreading method.

As shown in FIG. 1, spreading section 214 performs first spreading of the response signal by the ZC sequence set in control section 209, and outputs the response signal subjected to first spreading to IFFT section 215.

As shown in FIG. 1, IFFT section 215 performs an IFFT of the response signal subjected to first spreading, and outputs the response signal subjected to an IFFT to CP attaching section 216.

CP attaching section 216 attaches the same signal as the tail end part of the response signal subjected to an IFFT, to the head of that response signal as a CP.

As shown in FIG. 1, spreading section 217 performs second spreading of the response signal with a CP by the Walsh sequence set in control section 209, and outputs the response signal subjected to second spreading to radio transmitting section 218.

Radio transmitting section 218 performs transmission processing such as D/A conversion, amplification and up-conversion on the response signal subjected to second spreading, and transmits the resulting signal from antenna 201 to base station 100 (in FIG. 2).

According to the present embodiment, a response signal is subjected to two-dimensional spreading, by first spreading using a ZC sequence and second spreading using a Walsh sequence. That is to say, the present embodiment spreads a response signal on the cyclic shift axis and on the Walsh axis.

Next, sequence control in control section 209 of mobile station 200 will be explained in detail.

As described above, if a plurality of CCE's are allocated to a single mobile station and the mobile station transmits a response signal using only the PUCCH associated with the CCE of the minimum number among the plurality of CCE's, PUCCH's associated with the other CCE's than the CCE of the minimum number are not used among the plurality of CCE's. That is, if a plurality of CCE's are allocated to a single mobile station, there are physical resources for response signals that are not used (available physical resources). Therefore, according to the present embodiment, when a plurality of CCE's are allocated to a single mobile station, available physical resources provided as above are utilized as guard intervals of a detection window interval of a ZC sequence. By this means, it is possible to prevent inter-code interference between ZC sequences while maintaining the use efficiency of PUCCH.

Figure 5:
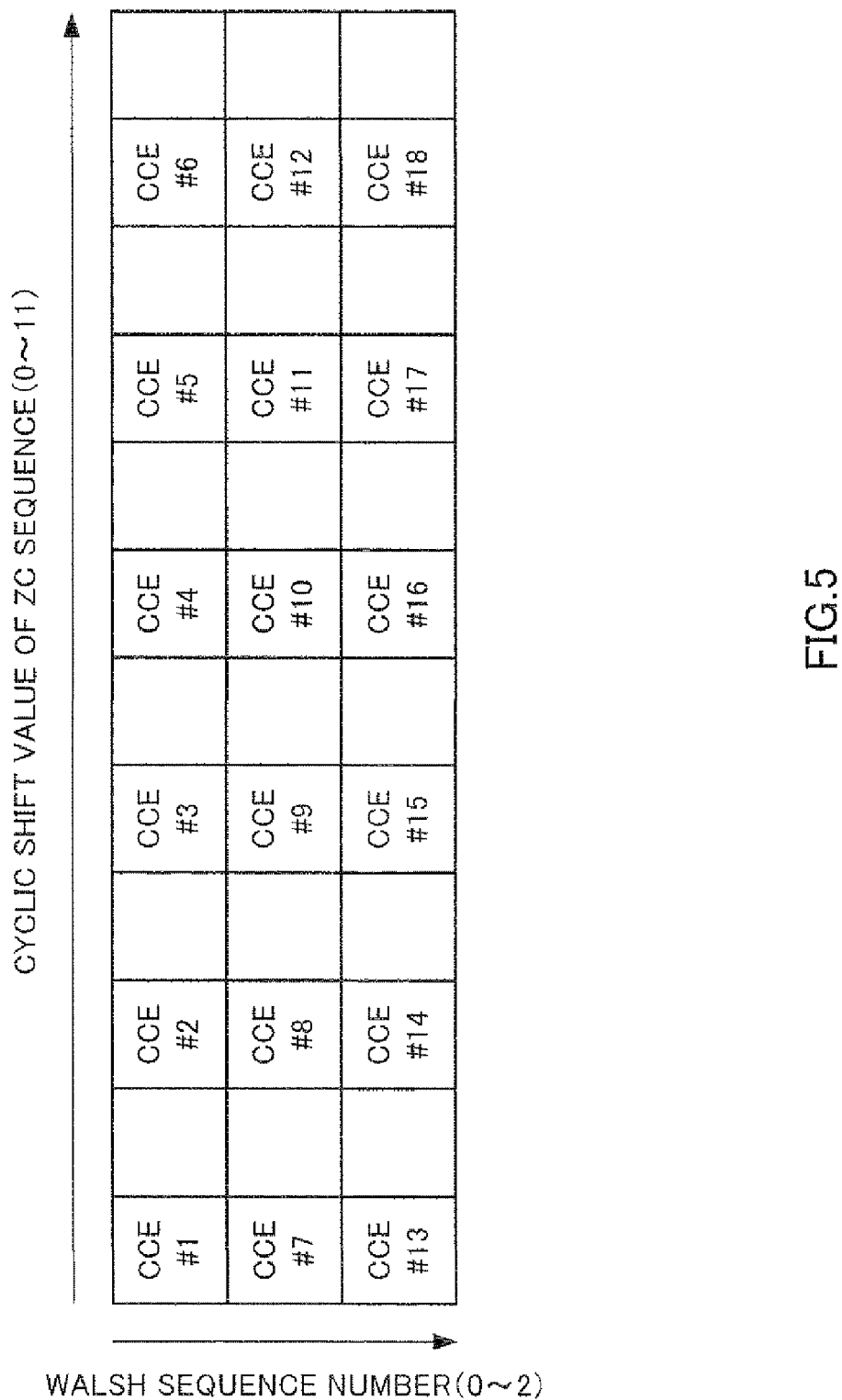
FIG. 5 illustrates associations between ZC sequences, Walsh sequences and CCE's according to an embodiment of the present invention.

Here, as shown in FIG. 5, the following explanation presumes that the CCE numbers and the PUCCH numbers shown in FIG. 4 are associated on a one-to-one basis.

Figure 6:
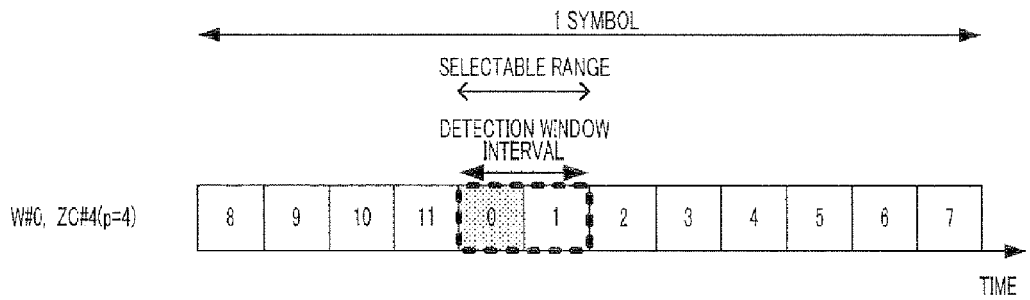
FIG. 6 illustrates a selection example of a ZC sequence according to an embodiment of the present invention (when one PDCCH occupies one CCE of CCE #3)

(1) In a Case where One PDCCH Occupies One CCE (FIG. 6)

For example, when a PDCCH for mobile station 200 occupies CCE #3, deciding section 208 in mobile station 200 decides PUCCH #3 associated with CCE #3 as a PUCCH that can be used to transmit a response signal of that mobile station. Therefore, in this case, as shown in FIG. 6, control section 209 sets W #0 in spreading section 217 according to the associations shown in FIG. 4. Further, in this case, control section 209 can select ZC #4 (cyclic shift value p=4) or ZC #5 (cyclic shift value p=5) as a ZC sequence. Therefore, as shown in FIG. 6, control section 209 selects and sets ZC #4 in spreading section 214.

Figure 7:
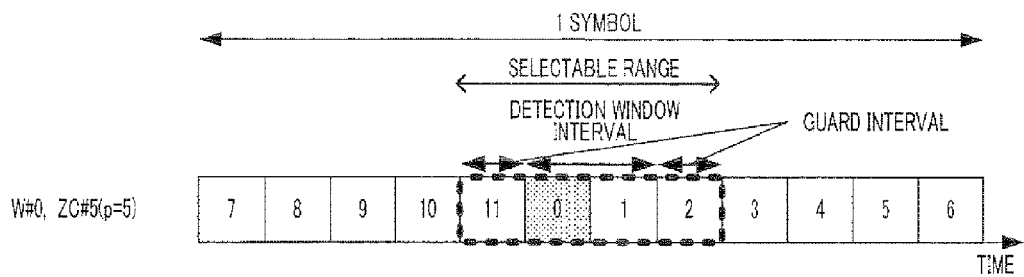
FIG. 7 illustrates a selection example of a ZC sequence according to an embodiment of the present invention (when one PDCCH occupies two CCE's of CCE #3 and CCE #4)

(2) In a Case where One PDCCH Occupies Two CCE's of CCE #3 and CCE #4 (FIG. 7)

For example, when the PDCCH for mobile station 200 occupies two CCE's of CCE #3 and CCE #4, deciding section 208 in mobile station 200 decides PUCCH #3 and PUCCH #4 associated with CCE #3 and CCE #4, respectively, as PUCCH's that can be used to transmit a response signal of that mobile station. Therefore, in this case, as shown in FIG. 7, control section 209 sets W #0 in spreading section 217 according to the associations shown in FIG. 4. Further, in this case, control section 209 can select one of ZC #4 (cyclic shift value p=4) to ZC #7 (cyclic shift value p=7) as a ZC sequence. Therefore, to maximize the guard intervals at both ends of the detection window interval of a ZC sequence used by the subject mobile station, control section 209 selects and sets ZC

5 (cyclic shift value p=5) in spreading section 214 as shown in FIG. 7. By this means, it is possible to provide guard intervals each corresponding to one cyclic shift value, at both ends of the detection window interval of the ZC sequence (ZC #5) used by the subject mobile station. That is, it is possible to provide the cyclic shift interval "3" between the ZC sequence (ZC #5) used by the subject mobile station and a ZC sequence (ZC #2 or ZC #8) that can be used by another mobile station. Therefore, it is possible to reliably prevent inter-code interference with another mobile station that performs first spreading of a response signal using ZC #2 or ZC #8.

Figure 8:
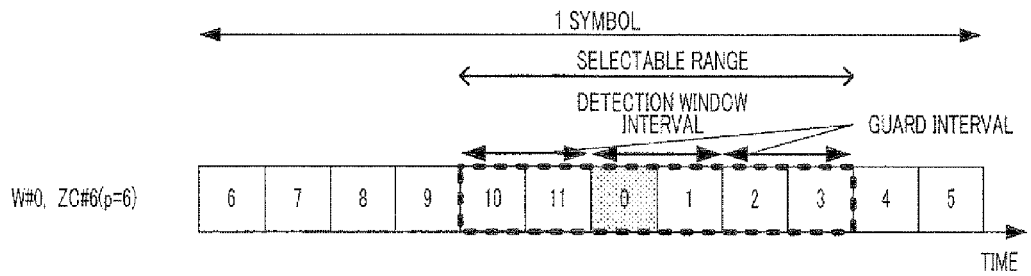
FIG. 8 illustrates a selection example of a ZC sequence according to an embodiment of the present invention (when one PDCCH occupies three CCE's of CCE #3, CCE #4 and CCE #5)

(3) In a Case where One PDCCH Occupies Three CCE's of CCE #3, CCE #4 and CCE #5 (FIG. 8)

For example, when a PDCCH for mobile station 200 occupies three CCE's of CCE #3, CCE #4 and CCE #5, deciding section 208 in mobile station 200 decides PUCCH #3, PUCCH #4 and PUCCH #5 associated with CCE #3, CCE #4 and CCE #5, respectively, as PUCCH's that can be used to transmit a response signal of that mobile station. Therefore, in this case, as shown in FIG. 8, control section 209 sets W in spreading section 217 according to the associations shown in FIG. 4. Further, in this case, control section 209 can select one of ZC #4 (cyclic shift value p=4) to ZC #9 (cyclic shift value p=9) as a ZC sequence. Therefore, to maximize the guard intervals at both ends of the detection window interval of a ZC sequence used by the subject mobile station, control section 209 selects and sets ZC #6 (cyclic shift value p=6) in spreading section 214 as shown in FIG. 8. By this means, it is possible to provide guard intervals each corresponding to two cyclic shift values, at both ends of the detection window interval of the ZC sequence (ZC #6) used by the subject mobile station. That is, it is possible to provide the cyclic shift interval "4" between the ZC sequence (ZC #6) used by the subject mobile station and a ZC sequence (ZC #2 or ZC #10) that can be used by another mobile station. Therefore, it is possible to reliably prevent inter-code interference with another mobile station that performs first spreading of a response signal using ZC #2 or ZC #10.

Figure 9:
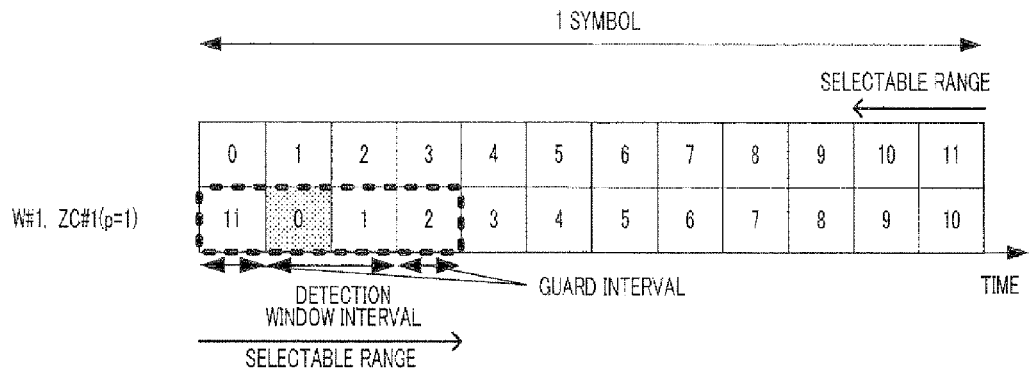
FIG. 9 illustrates a selection example of a ZC sequence according to an embodiment of the present invention (when one PDCCH occupies three CCE's of CCE #6, CCE #7 and CCE #8)

(4) In a Case where One PDCCH Occupies Three CCE's of CCE #6, CCE #7 and CCE #8 (FIG. 9)

For example, when a PDCCH for mobile station 200 occupies three CCE's of CCE #6, CCE #7 and CCE #8, deciding section 208 in mobile station 200 decides PUCCH #6, PUCCH #7 and PUCCH #8 associated with CCE #6, CCE #7 and CCE #8, respectively, as PUCCH's that can be used to transmit a response signal of that mobile station. In this case, control section 209 can select one of ZC #10 (cyclic shift value p=10) and ZC #11 (cyclic shift value p=11) as the ZC sequence associated with W #0, and select one of ZC #0 (cyclic shift value p=0) to ZC #3 (cyclic shift value p=3) as the ZC sequence associated with W #1. Therefore, as shown in FIG. 9, between W #0 and W #1, control section 209 sets W #1 having a wider selectable range of cyclic shift values in spreading section 217. Therefore, a ZC sequence that can be selected by control section 209 is one of ZC #0 (cyclic shift value p=0) to ZC #3 (cyclic shift value p=3). Therefore, to maximize the guard intervals at both ends of the detection window interval of a ZC sequence used by the subject mobile station, control section 209 selects and sets ZC #1 (cyclic shift value p=1) in spreading section 214 as shown in FIG. 9. By this means, it is possible to provide guard intervals each corresponding to one cyclic shift value, at both ends of the detection window interval of the ZC sequence (ZC #1) used by the subject mobile station. That is, it is possible to provide the cyclic shift interval "3" between the ZC sequence (ZC #1) used by the subject mobile station and a ZC sequence (ZC #4) that can be used by another mobile station. Therefore, it is possible to reliably prevent inter-code interference with another mobile station that performs first spreading of a response signal using ZC #4.

Thus, according to the present embodiment, a mobile station, to which a PDCCH that occupies a plurality of CCE's are allocated, selects a cyclic shift value among selectable cyclic shift values so as to maximize the guard intervals at both ends of the detection window interval.

Figure 10:
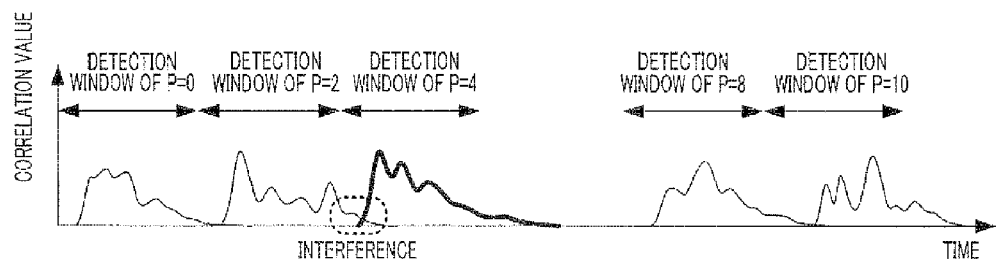
FIG. 10 shows correlation values (prior art)

Here, for example, when one PDCCH occupies two CCE's of CCE #3 and CCE #4, among ZC #4 (cyclic shift value p=4) to ZC #7 (cyclic shift value p=7) that can be selected as a ZC sequence, a conventional mobile station uses ZC #4 (cyclic shift value p=4) based on PUCCH #3 associated with the CCE of the minimum number. Therefore, the correlation values found in correlation processing section 115 of base station 100 are shown in FIG. 10. That is, interference components of ZC #2 (cyclic shift value p=2) used by another mobile station may appear in the detection window interval of ZC #4 (cyclic shift value p=4) used by the subject mobile station, which causes inter-code interference from ZC #2 to ZC #4.

Figure 11:
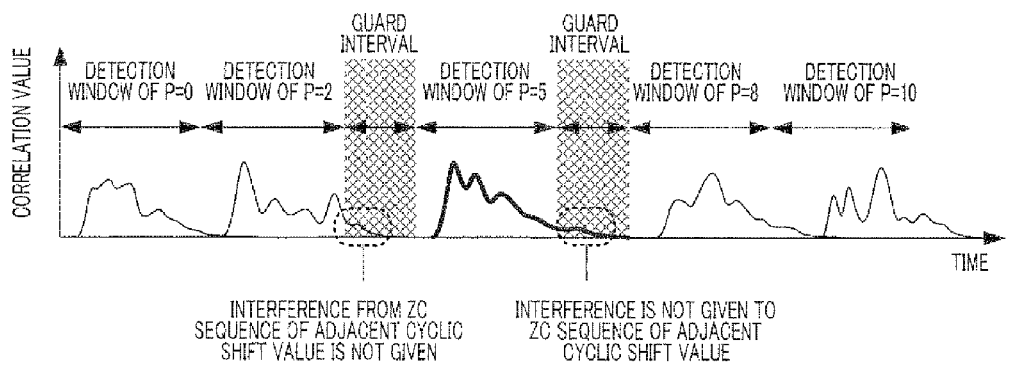
FIG. 11 shows correlation values according to an embodiment of the present invention.

By contrast with this, when one PDCCH occupies two CCE's of CCE #3 and CCE #4, as described above, mobile station 100 according to the present embodiment uses ZC #5 among ZC #4 (cyclic shift value p=4) to ZC #7 (cyclic shift value p=7) that can be selected as a ZC sequence. Therefore, the correlation values found in correlation processing section 115 of base station 100 are shown in FIG. 11. That is, it is possible to provide guard intervals at both ends of the detection window interval of ZC #5 (cyclic shift value p=5) used by the subject mobile station. By this means, it is possible to absorb interference from ZC #2 (cyclic shift value p=2) in the guard interval before ZC #5 (cyclic shift value p=5), and prevent interference components of ZC #2 (cyclic shift value p=2) used by another mobile station from occurring in the detection window interval of ZC #5 (cyclic shift value p=5) used by the subject mobile station. Further, it is possible to absorb interference from ZC #5 (cyclic shift value p=5) in the guard interval after ZC #5 (cyclic shift value p=5), and prevent interference components of ZC #5 (cyclic shift value p=5) used by the subject mobile station from occurring in the detection window interval of ZC #8 (cyclic shift value p=8) used by another mobile station.

Also, according to the present embodiment, as in prior art, PUCCH numbers are defined by cyclic shift values of ZC sequence and Walsh sequence numbers, as shown in FIG. 4.

Therefore, according to the present embodiment, it is possible to prevent inter-code interference and suppress degradation of separation performance of response signals while maintaining the use efficiency of PUCCH.

An embodiment of the present invention has been described above.

Also, a case has been described above with the embodiment where three Walsh sequences of Walsh sequences W #0 to W #2 are used. However, even in the case of using two, four or more Walsh sequences, it is equally possible to implement the present invention in the same way as above.

Also, a case has been described above with the embodiment where ZC sequences are used in first spreading. However, in first spreading, it is equally possible to use sequences that can be separated from each other by different cyclic shift values, other than ZC sequences. For example, in first spreading, it is equally possible to use GCL (Generalized Chirp Like) sequences, CAZAC sequences other than ZC sequences, PN sequences such as M sequences and orthogonal gold code sequences, and sequences generated using a computer.

Also, a case has been described above with the embodiment where Walsh sequences are used in second spreading. However, in second spreading, it is equally possible to use orthogonal sequences such as sequences formed with coefficients (each row or each column) of a discrete Fourier transform matrix, other than Walsh sequences. Also, the present invention is also applicable not only to cases where complete orthogonal sequences such as Walsh sequences are used in second spreading, but is also applicable to cases where, for example, incomplete orthogonal sequences such as PN sequences are used in second spreading.

That is, the present invention is applicable to any radio communication apparatuses that use sequences, which can be separated from each other by different cyclic shift values, for first spreading and sequences, which can be separated by differences of sequences, for second spreading.

Also, the definition of PUCCH numbers shown in FIG. 4 is by no means limiting. Also, the associations between CCE numbers and PUCCH numbers shown in FIG. 5 are by no means limiting. The present invention is applicable to all cases where there is a cyclic shift interval between sequences that can be separated from each other by different cyclic shift values.

Figure 12:
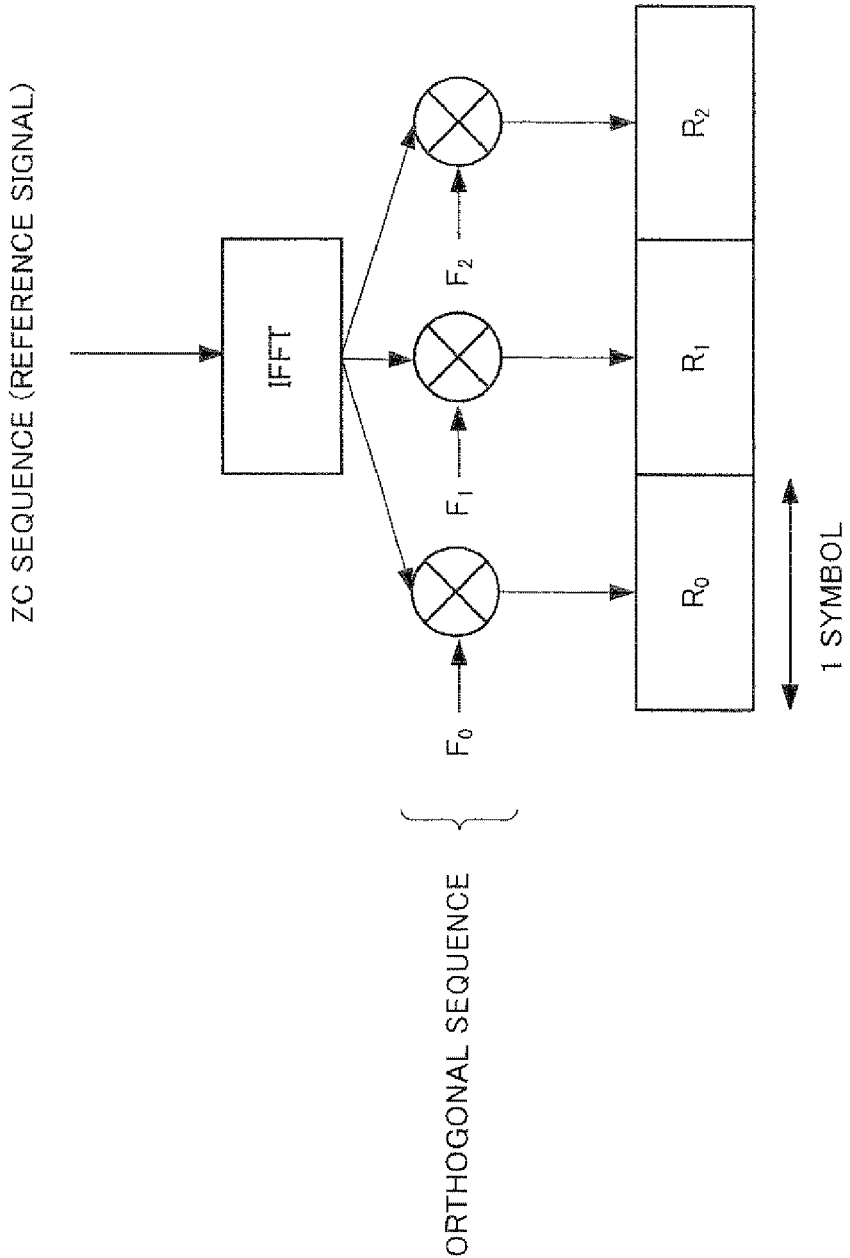
FIG. 12 illustrates a spreading method of a reference signal.

Also, cases have been described above with the embodiments where a plurality of response signals from a plurality of mobile stations are code-multiplexed. But, it is equally possible to implement the present invention even when a plurality of reference signals (e.g. pilot signals) from a plurality of mobile stations are code-multiplexed. As shown in FIG. 12, when three reference signal symbols $R_0$, $R_1$ and $R_2$, are generated from a ZC sequence (having a sequence length of 12), first, the ZC sequence is subjected to an IFFT in association with an orthogonal sequence ($F_0$, $F_1$, $F_2$) having a sequence length of 3. By this IFFT, it is possible to acquire a ZC sequence having a sequence length of 12 on the time domain. Then, the signal subjected to an IFFT is spread using the orthogonal sequence ($F_0$, $F_1$, $F_2$). That is, one reference signal (i.e. ZC sequence) is allocated to three symbols $R_0$, $R_1$ and $R_2$. Similarly, other mobile stations allocate one reference signal (i.e. ZC sequence) to three symbols $R_0$, $R_1$ and $R_2$. Here, individual mobile stations use ZC sequences of different cyclic shift values on the time domain, or different orthogonal sequences. In this case, the sequence length of ZC sequences is 12, so that it is possible to use twelve ZC sequences of cyclic shift values "0" to "11," generated from the same ZC sequence. Also, the sequence length of orthogonal sequences is 3, so that it is possible to use three different Walsh sequences. Therefore, in an ideal communication environment, it is possible to code-multiplex maximum 36 (12×3) response signals from mobile stations.

Also, a PUCCH used in the above-described embodiments is a channel to feed back an ACK or NACK, and therefore may be referred to as an "ACK/NACK channel."

Also, in the same way as above, the present invention is also applicable to a case where control information other than response signals is fed back.

Also, an uplink control channel to transmit an ACK or NACK response signal is not limited to a PUCCH. Also, a downlink control channel to transmit control information for reporting a resource allocation result of downlink data, is not limited to a PDCCH.

Also, a mobile station may be referred to as a "terminal station," "UE," "MT," "MS" or "STA (STAtion)". Also, a base station may be referred to as "Node B," "BS" or "AP." Also, a subcarrier may be referred to as a "tone." Also, a CP may be referred to as a "GI (Guard Interval)".

Also, the error detection method is not limited to CRC check.

Also, a method of performing conversion between the frequency domain and the time domain is not limited to IFFT and FFT.

Also, a case has been described with the above-described embodiments where the present invention is applied to mobile stations. However, the present invention is also applicable to a fixed radio communication terminal apparatus in a stationary state and a radio communication relay station apparatus that performs the same operations with a base station as a mobile station. That is, the present invention is applicable to all radio communication apparatuses.

Although a case has been described with the above embodiments as an example where the present invention is implemented with hardware, the present invention can be implemented with software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2007-211544, filed on Aug. 14, 2007, including the specification, drawings and abstract, is incorporated herein by reference in its entirety.

INDUSTRIAL APPLICABILITY

The present invention is applicable to, for example, mobile communication systems.

The invention claimed is:

1. A radio communication apparatus comprising:
    a spreading section that spreads a response signal using one of a plurality of sequences that can be separated from each other by different cyclic shift values; and
    a transmitting section that transmits the spread response signal,
    wherein, in a case in which one physical downlink control channel (PDCCH) occupies a plurality of consecutive control channel elements (CCEs), the spreading section spreads the response signal using a sequence having a cyclic shift value that is obtained by adding one or more to a cyclic shift value associated with a CCE having a minimum CCE index in the plurality of consecutive CCEs, among the plurality of sequences.

2. The radio communication apparatus according to claim 1, wherein the spreading section spreads the response signal using a sequence of a cyclic shift value that maximizes guard intervals among a plurality of cyclic shift sequences corresponding to the consecutive CCEs.

3. The radio communication apparatus according to claim 1, wherein in a case in which a number of the consecutive control channel elements (CCEs) occupied by the one PDCCH is two, the response signal is spread using a sequence having a cyclic shift value that is obtained by adding one to the cyclic shift value associated with the CCE having the minimum CCE index.

4. The radio communication apparatus according to claim 1, wherein in a case in which a number of the consecutive control channel elements (CCEs) occupied by the one PDCCH is three, the response signal is spread using a sequence having a cyclic shift value that is obtained by adding two to the cyclic shift value associated with the CCE having the minimum CCE index.

5. A response signal spreading method performed by a radio communication apparatus, the response signal spreading method comprising:

spreading a response signal using one of a plurality of sequences that can be separated from each other by different cyclic shift values; and transmitting the spread response signal, wherein, in a case in which one physical downlink control channel (PDCCH) occupies a plurality of consecutive control channel elements (CCEs), the response signal is spread using a sequence having a cyclic shift value that is obtained by adding one or more to a cyclic shift value associated with a CCE having a minimum CCE index in the plurality of consecutive CCEs, among the plurality of sequences.

6. A radio communication apparatus comprising:

a spreading section that spreads a response signal using one of a plurality of sequences that can be separated from each other by different cyclic shift values; and a transmitting section that transmits the spread response signal, wherein, in a case in which one physical downlink control channel (PDCCH) occupies a plurality of consecutive control channel elements (CCEs), the response signal is spread using a sequence having a cyclic shift value, the cyclic shift value being an approximate average value between a first cyclic shift value associated with a first CCE located at an end of the PDCCH and a second cyclic shift value associated with a second CCE located at another end of the PDCCH, among the plurality of CCEs occupied by the one PDCCH.

\* \* \* \* \*